C. A. WARD.
CONTROLLER FOR ELECTRICAL VEHICLES.
APPLICATION FILED JUNE 11, 1920.
1,425,070.
Patented Aug. 8, 1922.
2 SHEETS—SHEET 1.
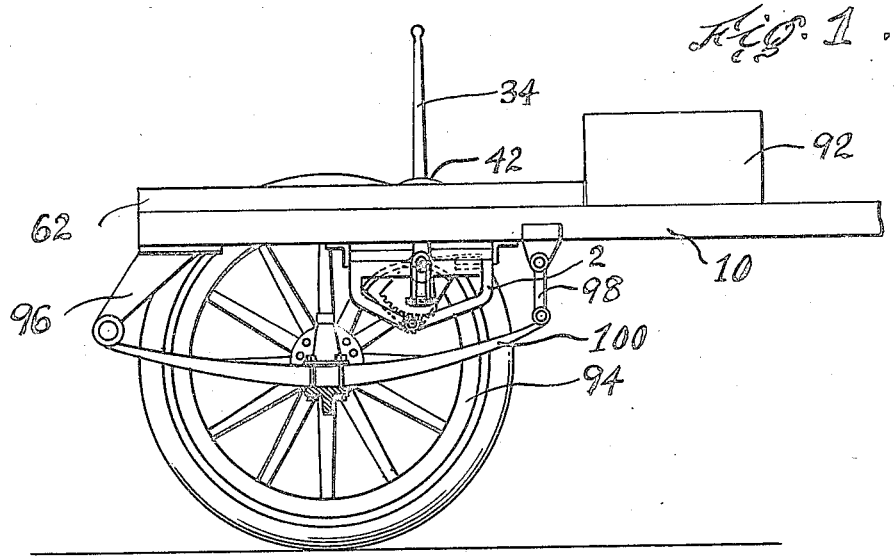
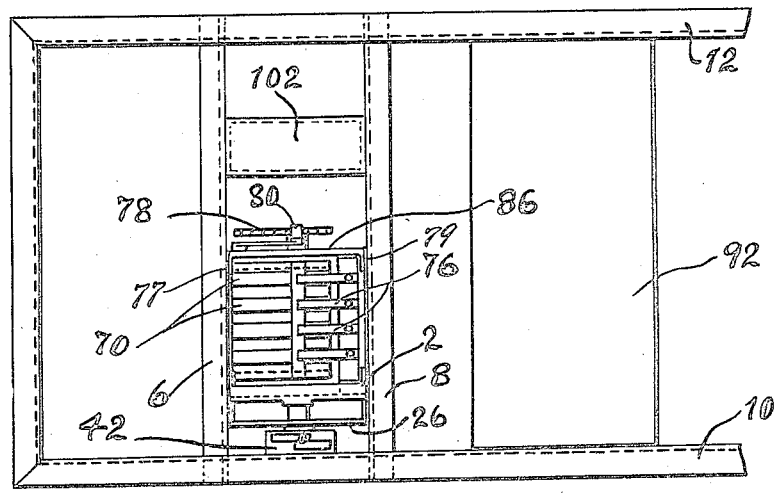
Inventor
Charles A. Ward.
By his Attorney

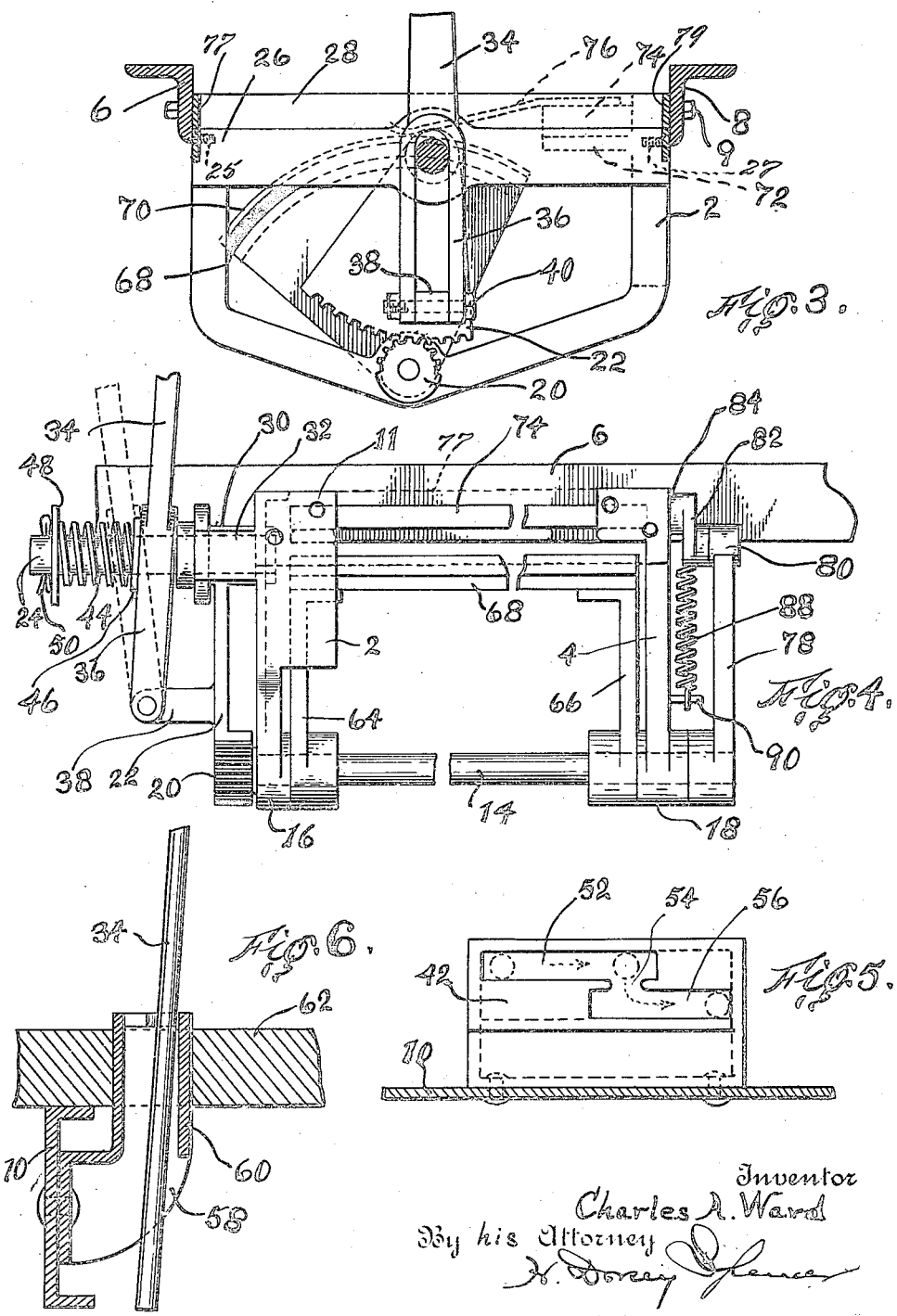

UNITED STATES PATENT OFFICE.

CHARLES A. WARD, OF MOUNT VERNON, NEW YORK.

CONTROLLER FOR ELECTRICAL VEHICLES.

1,425,070. Specification of Letters Patent. Patented Aug. 8, 1922.

Application filed June 11, 1920. Serial No. 388,200.

*To all whom it may concern:*

Be it known that I, CHARLES A. WARD, a citizen of the United States, residing at Mount Vernon, New York, have invented certain new and useful Improvements in Controllers for Electrical Vehicles, of which the following is a clear, full, and exact description.

This invention relates to electric vehicles, and particularly to controllers for such vehicles, and a general object of the invention is to improve and simplify the construction, operation and mounting of electric vehicle controllers.

Particular objects and important features of the invention will appear from the following description and claims when considered in connection with the accompanying drawings, in which—

Fig. 1 is a side elevation, partly broken away and partly in section, of an electric vehicle chassis having incorporated therein controller mechanism embodying the present invention;

Fig. 2 is a plan of the chassis frame and controller mechanism shown in Fig. 1.

Fig. 3 is an enlarged end elevation of the controller mechanism showing in particular the bracket support therefor, the controller handle being broken away;

Fig. 4 is a side elevation of the mechanism shown in Fig. 3;

Fig. 5 is a plan view of the guide for the controlling handle; and

Fig. 6 is a vertical transverse section through the guide shown in Fig. 5.

An important feature of the invention is the provision of controller mechanism which may be mounted beneath the floor of the vehicle and preferably suspended from the vehicle frame. A further important feature of the invention is the provision of a structure which is a complete unit in itself, thereby facilitating its assembly in the chassis.

In the illustrated construction, in which the foregoing and other novel and useful features are embodied, the controller mechanism is shown as carried by brackets 2 and 4, which form complete yokes depending from the bars 6 and 8. The bars 6 and 8 may extend across the chassis frame and in such case are preferably supported from the under sides of the side-bars 10 and 12 of said frame, the brackets 2 and 4 being so shaped and so connected to the angle bars 6 and 8 that the controller mechanism is substantially suspended from the vehicle chassis and in such position that the whole mechanism, with the exception of the handle and its guide, is located beneath the vehicle floor.

Only so much of the control mechanism is shown as is necessary to illustrate the invention, the illustrated mechanism comprising a rockshaft 14 carrying at one end a pinion 20 which meshes with a sector gear 22 having a bearing upon a stud shaft 24 fixed in integral crossbars 26 and 28 forming parts of the bracket 2, these crossbars being spaced apart to receive the hub 30 of the sector gear 22, and being connected by end pieces 32.

The controller handle 34 is provided with a fork 36 at its lower end, adapted to embrace the stud shaft 24 and to be pivotally connected to a lug or ear 38 upon the side of the sector gear 22, this pivotal connection being preferably effected by means of a nut and bolt 40, as shown in Fig. 3, to facilitate assembling of the mechanism. The purpose of this pivotal connection is to permit the controller handle to swing lengthwise of the shaft so that it may be moved from one to the other of two guide slots in a guide plate 42, by which the movements of the handle in its forward and reverse operations are guided and to some extent controlled.

A spring 44, confined between a washer 46 bearing against the handle fork 36 and a second washer or collar 48 confined upon the stud shaft by any suitable means—as, for example, the cotter pin 50—tends to hold the handle in the guide slot 52, in which it moves when effecting the control of the forward vehicle movement. When opposite the cross-slot 54, the control handle 34 may be moved against the spring 44 into the other guide slot 56, in which said handle may be moved to control the reverse movement of the vehicle. The guide plate 42 is preferably formed integral with a supporting bracket 58, shown in section in Fig. 6, this bracket being so shaped that it may be attached to the web of the adjacent side member 10 of the chassis frame. The bracket preferably also has a tubular or vertical slot portion 60 on that part which extends through the vehicle floor 62.

The rock shaft 14 has also mounted thereon between the brackets 2 and 4 sectors 64 and 66 carrying insulation 68 forming a support for certain of the switch members 70, which are shown merely diagrammatically in the drawings, these members in themselves constituting no part of the present invention. The brackets 2 and 4 are also provided with ledges 72, upon which is carried an insulating bar 74, upon which are mounted the spring members 76 of the switch mechanism.

To ensure holding the controller in any position of adjustment into which it may be moved, the end of the rock shaft 14, remote from that on which the pinion 20 is mounted, has attached thereto a notched sector 78—shown in plan in Fig. 2—upon which rides a roller 80 carried upon a lever arm 82 fulcrumed at 84 upon a crossbar 86 integral with the bracket 4, the roller 80 being pressed down upon the toothed upper edge of the sector 78 by the action of a spring 88 connected at one end to the arm 82, and at its other end to a pin or stud 90 upon the bracket 4.

In Fig. 1 of the drawings is shown a convenient location of the controller mechanism with respect to the other parts of the vehicle, this figure showing the vehicle floor 62, the chassis side frame member 10, the battery box 92, one of the front steering wheels 94, the spring goose neck 96, spring shackle 98, and spring 100, the last-mentioned parts being upon that side of the chassis frame remote from that upon which the wheel 94 is located. It will also be noted from Fig. 2 of the drawings that the resistance 102 is preferably carried by the supporting crossbars 6 and 8 which carry the remainder of the control mechanism, whereby this whole mechanism may be assembled ready to attach to the vehicle chassis and whereby it is all so located beneath the floor of the vehicle as to be readily accessible for adjustment or repair.

It will further be noted that the foregoing construction gives a long controller handle, and therefore a greater degree of sensibility is possible in the "feel" of the controller than with prior constructions in which the controller has been mounted upon the vehicle seat, or adjacent thereto, and consequently shorter handles have been used, requiring greater arm pressure by reason of the smaller leverage. It will also be noted that with the construction of the guide plate 42 and the long controller handle, a control more nearly approximating that of the familiar gas car control is provided than is now in use on other electric vehicles.

For convenience in assembling the controller mechanism, straps 77 and 79 may be used to connect the end brackets 2 and 4, these straps being preferably set into recesses in the sides of these brackets as shown in Fig. 3, whereby they are substantially flush with the outer surfaces of these sides. The straps are also preferably connected to the brackets by screws 25 and 27 which have their heads countersunk in the straps.

Having thus described my invention, what I claim and desire to secure by Letters Patent are:

1. Controller mechanism for electric vehicles comprising, in combination with the chassis frame and crossbars spaced upon said frame, supporting brackets at the ends of said mechanism spanning, connected to and suspended from said crossbars.

2. In an electric vehicle, a controller assembly comprising brackets and controller mechanism supported thereby, and crossbars which said brackets span, from which they suspend said mechanism and by which the assembled mechanism may be attached to the chassis frame.

3. In an electric vehicle, the combination with a controller mechanism located beneath the vehicle floor and a controller handle, of a controller handle guide extending through said floor and having integral therewith a laterally extending bracket by which it may be attached to the web of a chassis frame member.

4. In an electric vehicle, the combination with a controller mechanism adapted to be located beneath the vehicle floor, and a long controller handle, of a controller guide having a forward slot and a reverse slot and a transverse slot connecting said slots, and a spring tending to control the position of said handle with relation to said slots.

5. In an electric vehicle controller mechanism comprising a controller rockshaft, an operating gear therefor, and a controller handle connected to said gear, a bracket having in its lower part a bearing for the controller rockshaft and having in its upper part bearings for the controller handle and the controller shaft operating gear, said bracket also having provision in its upper part for connecting it to a cross support upon the vehicle chassis, whereby the controller mechanism may be suspended beneath the vehicle floor.

6. In an electric vehicle, controller mechanism, comprising brackets, each having in its lower part a bearing for a controller rockshaft and having in its upper part provision for suspending said bracket from the vehicle frame, one of said brackets also having in its upper part a bearing for a controller shaft-operating gear and for the controller handle, in combination with said shaft, said gear and said handle.

7. In an electric vehicle, the combination with the vehicle chassis, including channelled side frame members, of controller mechanism, crossbars extending between said side frame members, brackets spanning said cross bars and suspending said mechanism beneath the vehicle floor, said brackets comprising a bearing for a controller handle, a controller handle and a controller-handle guide extending through said vehicle floor and supported from the web of one of said frame members.

8. In an electric vehicle, the combination with the vehicle chassis, including side frame members and a vehicle floor, of controller mechanism suspended from said vehicle chassis beneath said vehicle floor and comprising an operating gear, a controller handle connected to said gear to swing therewith and also thereon and a handle guide extending through said vehicle floor and connected to one of said side frame members, said guide having a forward slot, a reverse slot, and a cross slot in which said handle may be swung on said gear between said forward and reverse slots.

9. In an electric vehicle controller mechanism, a bracket by which said mechanism may be suspended from the vehicle frame, said bracket having in its lower part a shaft bearing, and having in its upper part a stud shaft providing a bearing for a shaft-operating gear and for a gear-operating controller handle, and integral crossbars upon said bracket in which said stud shaft is supported and between which said gear is confined, in combination with said shaft, said gear, and said handle.

10. In an electric vehicle controller mechanism, a pair of cross bars adapted to span the vehicle frame, a pair of brackets adapted to span the cross bars, a controller shaft suspended by said brackets from said cross bars, an operating handle fulcrumed on one of said brackets, and a controller shaft operating gear also carried by said bracket and upon which said handle is fulcrumed to move in a plane transverse to the plane of its operating movement.

11. An electric vehicle controller mechanism comprising brackets, each having in its lower part a bearing for a controller shaft and having in its upper part provision for suspending said bracket from the vehicle frame, in combination with a controller handle, a controller rock shaft and operating connections between said handle and said shaft, all carried by said brackets.

12. An electric vehicle controller mechanism comprising brackets, each having in its lower part a bearing for a controller shaft and having in its upper part provision for suspending said bracket from the vehicle frame, in combination with a controller handle, a controller rock shaft and operating connection between said handle and said shaft, all carried by said brackets, and a controller handle guide having laterally offset slots between which said handle is movable and by which the controller operating movements of said handle are limited.

13. In an electric vehicle controller the combination with the controller mechanism and its operating handle directly connected thereto and movable in two planes, of a guide for said handle having laterally offset parallel slots in which and between which said handle is movable and by which the operating movements of said handle are limited.

Signed at Mt. Vernon, New York, this 30 day of April, 1920.

CHARLES A. WARD.